United States Patent
Kasagi

(10) Patent No.: US 6,679,370 B2
(45) Date of Patent: Jan. 20, 2004

(54) CONVEYING APPARATUS

(75) Inventor: Masao Kasagi, Osaka (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 10/236,148

(22) Filed: Sep. 6, 2002

(65) Prior Publication Data

US 2003/0042113 A1 Mar. 6, 2003

(30) Foreign Application Priority Data

Sep. 6, 2001 (JP) ........................................ 2001-270348

(51) Int. Cl.$^7$ .............................................. B65G 17/00
(52) U.S. Cl. .............................. 198/465.1; 198/867.15; 104/172.1
(58) Field of Search ..................... 198/465.1, 867.14, 198/867.15; 104/172.1, 172.5; 118/65

(56) References Cited

U.S. PATENT DOCUMENTS

| | | | | |
|---|---|---|---|---|
| 1,706,554 A | * | 3/1929 | Weber ..................... | 198/465.1 |
| 4,440,090 A | * | 4/1984 | Murai et al. ............... | 104/127 |
| 4,593,624 A | * | 6/1986 | Spiker ....................... | 104/172 |
| 4,615,274 A | * | 10/1986 | Hoehn ....................... | 104/167 |
| 4,669,388 A | * | 6/1987 | Dehne et al. ............... | 104/162 |
| 4,691,640 A | * | 9/1987 | Murai ....................... | 118/324 |
| 5,067,413 A | * | 11/1991 | Kiuchi et al. ............... | 104/168 |
| 5,556,466 A | * | 9/1996 | Martin et al. ............. | 198/465.1 |
| 6,170,650 B1 | * | 1/2001 | Morikiyo et al. ......... | 198/867.14 |
| 6,324,992 B1 | * | 12/2001 | Morikiyo et al. ......... | 198/465.1 |
| 6,372,107 B1 | * | 4/2002 | Besinger et al. ........... | 204/479 |
| 6,378,441 B2 | * | 4/2002 | Lipari et al. ............. | 104/172.3 |
| 6,494,304 B1 | * | 12/2002 | Jaynes et al. ............ | 198/345.2 |

* cited by examiner

Primary Examiner—Douglas Hess
(74) Attorney, Agent, or Firm—Goodwin Procter LLP

(57) ABSTRACT

The conveying apparatus comprises a conveying path, a return path, an endless circulating driver and pallet supporting and driving means. The conveying path includes a horizontal inlet path, a horizontal outlet path, and an inclined path connected to at least one of the inner ends of the inlet and outlet path. The circulating driver circulates between the conveying path and return path. The supporting and driving mechanism are mounted at intervals on the circulating driver. The pallet supporting and driving mechanism include a front pallet support for supporting a front portion of the pallet, a rear pallet support for supporting a rear portion of the pallet, and a driving engager for automatically engaging with the pallet near the front pallet support. The pallet includes a front supported part that can be supported by the front pallet support, a rear supported part that can be supported by the rear pallet support movable relative to the pallet in the predetermined direction, and an engaged part for automatically engaging with the driving engager. The pallet conveyed to the inlet path section can be transferred onto one of the supporting and driving mechanism, which conveys the pallet on it along the conveying path to the outlet path section.

16 Claims, 5 Drawing Sheets

CONVEYING APPARATUS

FIELD OF THE INVENTION

The present invention relates to a conveying apparatus suitable for conveying a number of coated car bodies or other loads supported on pallets in a drying furnace or the like.

PRIOR ART

Known conveying apparatus include a drying furnace through which loads successively pass and is installed between two conveying paths and positioned at a level higher than the paths. The inlet and outlet of the drying furnace are each provided with a lifting section for lifting and lowering the loads. This makes it possible to position the furnace inlet and outlet at a lower level in order to prevent heat from escaping out of the furnace through the inlet or outlet. Consequently, the thermal efficiency of the furnace can be higher. Such a drying furnace may be incorporated in a conveying line for conveying a number of loads on pallets supported and conveyed by a roller conveyor or the like. In this case, the inlet and outlet of the drying furnace need to be provided with large lifters for lifting and lowering the pallets. However, this results in enlargement of the apparatus and a great increase of the installation cost. Additionally, depending on the capacity of the lifters, it may be necessary to lengthen the time intervals at which the loads are conveyed into the drying furnace. This affects the overall cycle time.

SUMMARY OF THE INVENTION

The object of the present invention is to provide a conveying apparatus that can solve the foregoing problems with the prior art.

According to the present invention, there is provided a conveying apparatus for conveying a pallet in a predetermined direction. The conveying apparatus comprises a specific conveying path, a return path, an endless circulating driver and a number of pallet supporting and driving means. The conveying path includes a horizontal inlet path section, a horizontal outlet path section, and an inclined path section connected to at least one of the inner ends of the inlet and outlet path sections. The circulating driver circulates between the conveying and return paths. The supporting and driving means are mounted at intervals on the circulating driver. Each of the pallet supporting and driving means includes a front pallet support for supporting a front portion of the pallet, a rear pallet support for supporting a rear portion of the pallet, and a driving engager for automatically engaging with the pallet near the front pallet support. The pallet includes a front supported part that can be supported by the front pallet support, a rear supported part that can be supported by the rear pallet support movable relative to the pallet in the predetermined direction, and an engaged part for automatically engaging with the driving engager. The pallet conveyed to the inlet path section can be transferred onto one of the supporting and driving means, which conveys the pallet on it along the conveying path to the outlet path section.

A load can be carried on the pallet, which may be supported and conveyed by a roller conveyor. By merely transferring the pallet to the horizontal inlet path section by a suitable means, it is possible to support the pallet on the pallet supporting and driving means, and convey the supported pallet along the inclined path section into a conveying path connected to the inclined path section and positioned at a different level. In other words, a common conveying means conveys the pallet along the inclined path section and the conveying path at the different level. This removes the need to provide an exclusive lifter or the like for lifting or lowering the pallet. Consequently, the cost for the installation may be greatly reduced. Additionally, the apparatus is easy to control. Pallets can be conveyed successively into the conveying path at the different level. As a result, the work cycle time can be greatly shortened.

The conveying apparatus may further comprise two roller conveyors each provided in one of the horizontal inlet and outlet path sections. The roller conveyors may each include a pair of right and left roller rails for supporting both sides of the pallet. The pallet may include a pair of side frames that can be supported by the roller rails, a cross frame extending as both of the front supported part and the engaged part between the side frames, and a pair of right and left longitudinal frames extending as the rear supported part in the predetermined direction between the side frames.

The roller rails can support the pallet in the horizontal inlet and outlet path sections. This makes it easy to transfer the pallet to the inlet path section and from the outlet path section. More specifically, the roller rails can support the side frames of the pallet. The cross frame, which connects the side frames, can function both as the front supported part that can be supported by the front pallet support, and as the engaged part that can engage with the driving engager. This enables the pallet to be simple in structure with only the longitudinal frames added as the rear supported part that can be supported by the rear pallet support.

The front and rear pallet supports may each include a pair of right and left horizontal-axis rollers, each of which includes a flange. The front and rear supported parts of the pallet may have grooves for loosely engaging with the flanges of the rollers.

The roller flanges can engage with the pallet grooves to laterally position the pallet supported and conveyed by the pallet supporting and driving means. Consequently, without a special positioner provided, the pallet can be conveyed safely without laterally deviating.

The driving engager may include a pair of front and rear self-locking pawls for engaging with the front and rear sides respectively of the engaged part of the pallet. The pawls can tilt toward each other. In one embodiment, the pawls can only tilt toward each other. The engager may also include urging means urging the pawls into an erect position.

This structure makes it possible to convey the pallet reliably and safely at a predetermined speed in the predetermined direction, not only at the horizontal path sections, but also along the inclined path section, which may be either an up-grade path section or a down-grade path section.

The endless circulating driver may include a pair of right and left driving chains and a pair of guide rails each supporting and guiding one of the driving chains. The circulating driver may also include a front connecting member and a rear connecting member, which may be spaced from the front connecting member in the predetermined direction. The connecting members connect the driving chains together. The circulating driver may further include a front supporting frame and a rear supporting frame. The front supporting frame stands on the front connecting member and supports the front pallet support and the driving engager. The rear supporting frame stands on the rear connecting member and supports the rear pallet support.

This structure makes it possible to inexpensively produce a conveying apparatus that can be effectively used to convey large pallets.

EMBODIMENT OF THE INVENTION

The following sections describe exemplary embodiments of the present invention. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not," "must," and "must not," are not meant to limit the scope of the present invention as the embodiments disclosed herein are merely exemplary.

Figure 1:
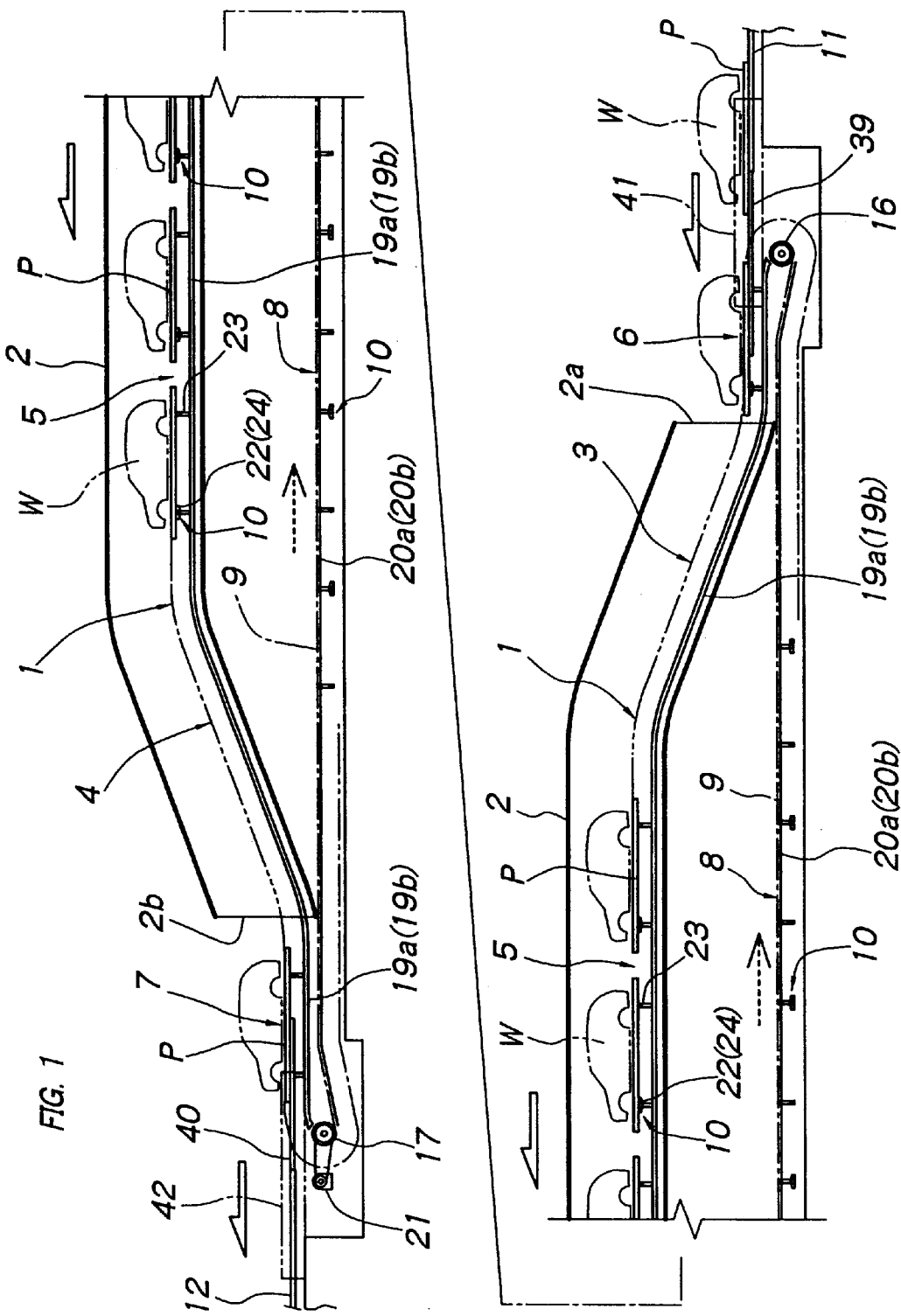
FIG. 1 is a schematic sectional side view of a conveying apparatus embodying the present invention.

A preferred embodiment of the present invention is described below with reference to the accompanying drawings. With reference to FIG. 1, a specific conveying path 1 extends through a drying furnace 2. The conveying path 1 consists of an up-grade path section 3, a down-grade path section 4, a higher horizontal section 5, a horizontal inlet path section 6 and a horizontal outlet path section 7. The up-grade path section 3 and down-grade path section 4 are formed on the inlet and outlet sides respectively of the furnace 2. The higher section 5 extends between the up-grade path section 3 and down-grade path section 4. The inlet and outlet path sections 6 and 7 are connected to the outer ends of the up-grade path section 3 and down-grade path section 4 respectively. The inlet 2a and outlet 2b of the furnace 2, which are the inlet of the up-grade path section 3 and the outlet of the down-grade path section 4 respectively, may be fitted with air curtains, automatic doors or other known fittings (not shown).

A generally horizontal return path 8 extends under the overall length of the conveying path 1. These paths 1 and 8 constitute an endless circulating path, where an endless circulating driver 9 circulates. The driver 9 carries a number of pallet supporting and driving means 10 fixed to it at suitable intervals. The inlet and outlet ends of the conveying path 1 are connected to two conveyors 11 and 12 respectively, such as roller conveyors or other suitable known conveyors, which convey pallets P to the path 1 and from it respectively.

Figure 4:
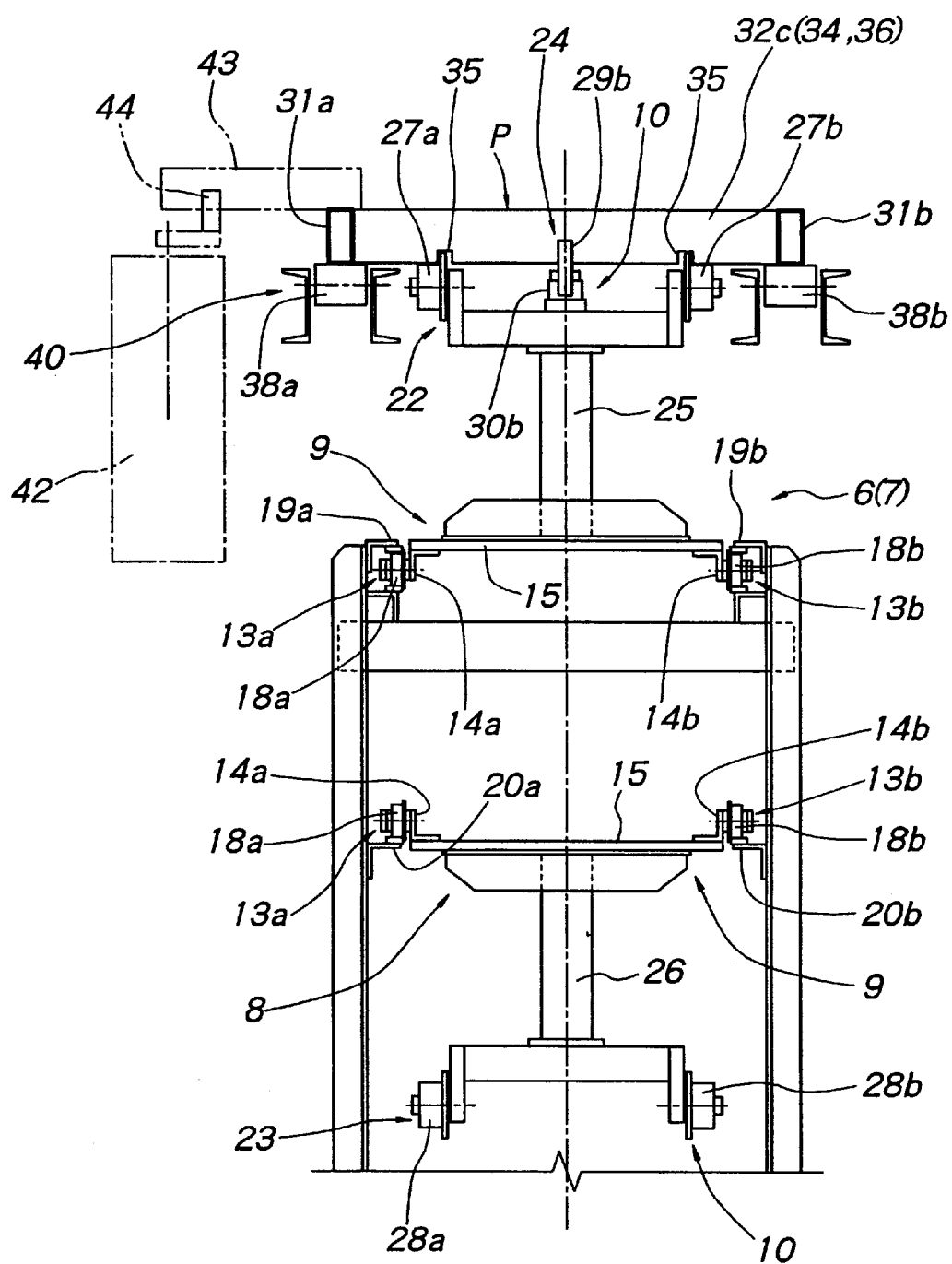
FIG. 4 is an elevation view of the conveying apparatus in cross section at the horizontal outlet path section of the specific conveying path of an apparatus.
Figure 5:
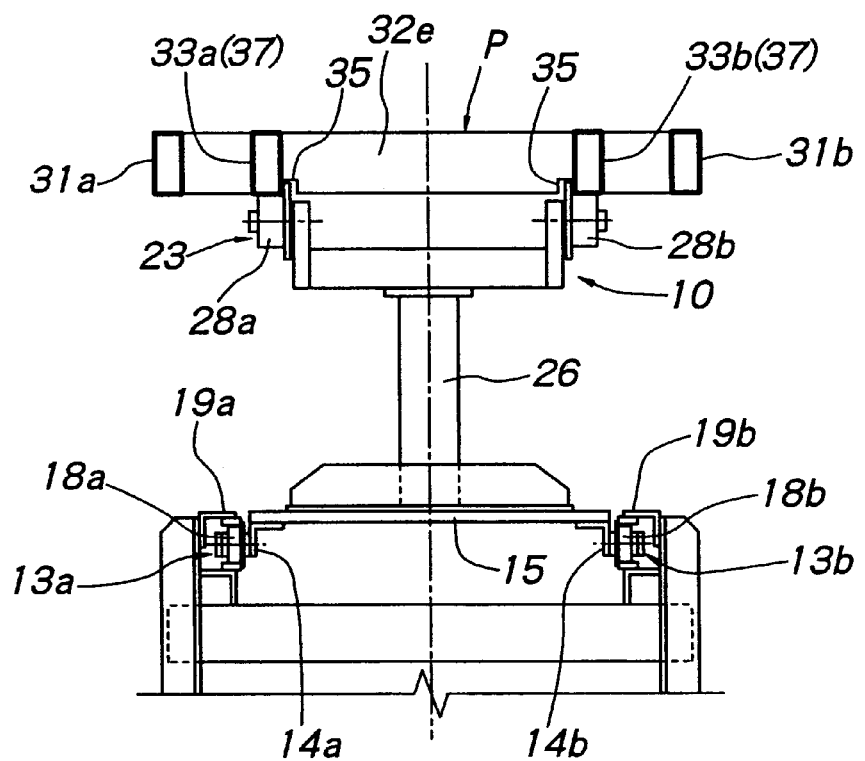
FIG. 5 is an elevation view of a pallet and a pallet supporting and driving means of a conveying apparatus in cross section at the rear pallet support of this means.

As shown in FIGS. 2B and 3–5, the circulating driver 9 consists of a pair of left and right driving roller chains 13a and 13b and a number of connecting plates 15. Each connecting plate 15 connects one pair of outer links 14a and 14b of the chains 13a and 13b. As shown in FIG. 1, two pairs of right and left gears 16 and 17 are supported on the inlet and outlet sides respectively of the conveying path 1. The chains 13a and 13b are in driving engagement with the gears 16 and 17. The links of the chains 13a and 13b are connected by pins, which support flanged rollers 18a and 18b respectively. As shown in FIGS. 4 and 5, the conveying path 1 is fitted with a pair of left and right guide rails 19a and 19b in the form of grooves. The rollers 18a and 18b can engage with and roll along the rails 19a and 19b respectively. As shown in FIG. 4, the return path 8 is fitted with a pair of left and right guide rails 20a and 20b. The rollers 18a and 18b can be supported on and roll along the rails 20a and 20b respectively. The pair of gears 17 on the outlet side of the conveying path 1 is driven by a motor 21. The pair of gears 16 on the inlet side of the conveying path 1 can be positioned for the tension adjustment of the chains 13a and 13b.

Each supporting and driving means 10 consists of a front pallet support 22, a rear pallet support 23 and a driving engager 24. The supports 22 and 23 can support a front portion and a rear portion respectively of a pallet P. The engager 24 is provided near the front pallet support 22 and can automatically engage with the pallet P supported by the supports 22 and 23. The front pallet support 22 consists of a pair of left and right flanged horizontal-axis rollers 27a and 27b, which are supported by a front supporting frame 25. The rear pallet support 23 consists of a pair of left and right flanged horizontal-axis rollers 28a and 28b, which are supported by a rear supporting frame 26. Each of the frames 25 and 26 stands on one of two connecting plates 15 of the circulating driver 9 that are spaced at a suitable distance from each other. These rollers 27a, 27b, 28a and 28b may be positioned at the corners of a virtual, generally rectangular region parallel to the conveying direction. The engager 24 is positioned in the middle of the front supporting frame 25 between the rollers 27a and 27b of the front pallet support 22. The engager 24 includes a front self-locking pawl 29a and a rear self-locking pawl 29b, which are supported by the front supporting frame 25 in such a manner that they can tilt toward each other. In one embodiment, the front and rear self-locking pawls can only tilt toward each other. The pawls 29a and 29b are fitted with weights 30a and 30b on their respective outer ends. The weights 30a and 30b urge the inner ends of the pawls 29a and 29b respectively into an erect position. The weights 30a and 30b may be replaced with springs or the like.

Figure 2:
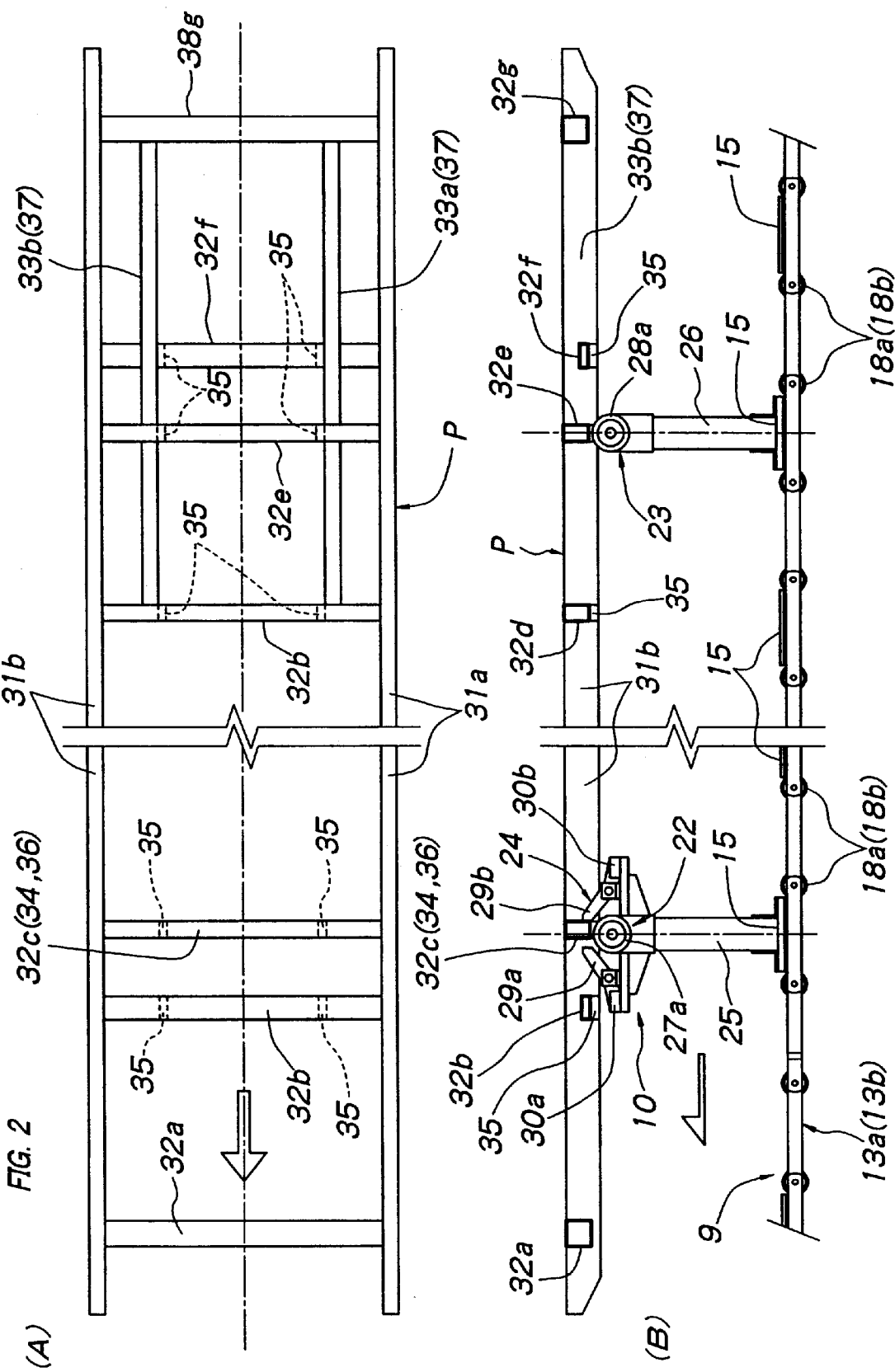
FIG. 2A is a partially cut plan view of a pallet that can be conveyed by a conveying apparatus.
FIG. 2B is a partially cut sectional side view of the pallet and a partially cut side view of a pallet supporting and driving means of a conveying apparatus.
Figure 3:
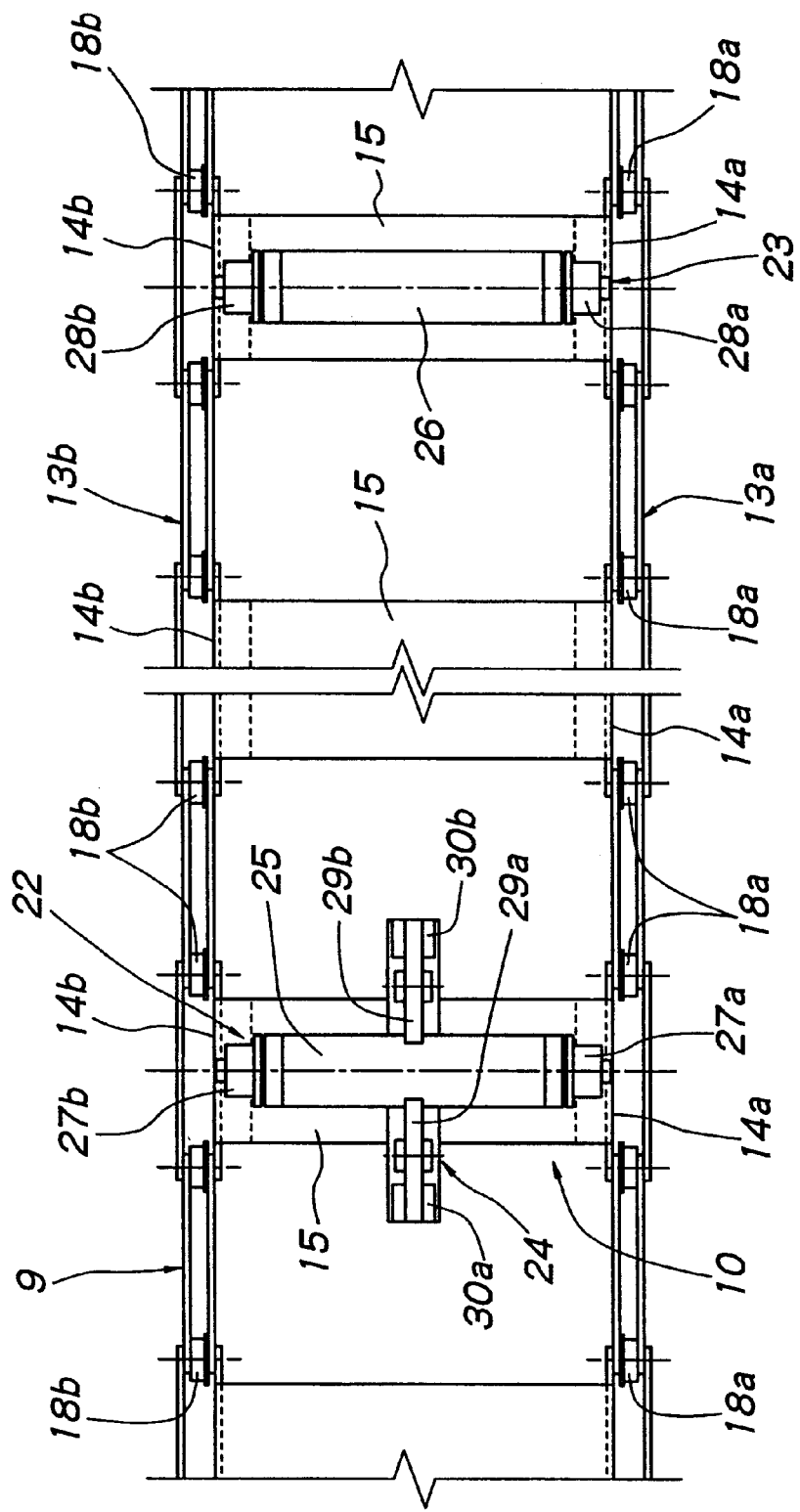
FIG. 3 is a partially cut plan view of the pallet supporting and driving means shown in FIG. 2B.

As shown in FIGS. 2, 4 and 5, each pallet P includes a pair of left and right side frames 31a and 31b, a number of cross frames 32a–32g and a pair of left and right longitudinal frames 33a and 33b. The side frames 31a and 31b extend generally in parallel to the conveying direction and are connected by the cross frames 32a–32g. The longitudinal frames 33a and 33b extend inside and generally in parallel to the side frames 31a and 31b, and between the intermediate and rear cross frames 32d and 32g. Each pallet P also includes attachments (not shown) for supporting a load W (for example, a car body in FIG. 1) in position.

The intermediate cross frame 32c spaced at a suitable distance from the front cross frame 32a functions as a front supported part 34, which can be supported by the front horizontal-axis rollers 27a and 27b of one supporting and driving means 10. This cross frame 32c also functions as an engaged part 36, which can be engaged by the driving engager 24 (between the self-locking pawls 29a and 29b) of the supporting and driving means 10. The longitudinal frames 33a and 33b function as rear supported parts 37, which can be supported by the rear horizontal-axis rollers 28a and 28b of the supporting and driving means 10. The bottoms of the intermediate cross frames 32b–32f are generally flush with the bottom of the pallet P and each formed with a pair of grooves 35, which can loosely engage with the flanges of the rollers 27a, 27b, 28a and 28b so that the pallet P can move forward and backward relative to the supporting and driving means 10.

As shown in FIGS. 1 and 4, the horizontal inlet and outlet path sections 6 and 7 at both ends of the conveying path 1 are fitted with roller conveyors 39 and 40 respectively, which are connected to the conveyors 11 and 12 adjacent to the roller conveyors 39 and 40 respectively. Each of the roller conveyors 39 and 40 consists of a pair of left and right roller rails 38a and 38b. As shown in FIG. 4, these rails 38a and 38b can support the side frames 31a and 31b respectively of the pallets P in such a manner that the pallets can move in the conveying direction.

As shown with two-dot chain lines in FIG. 1, the conveying apparatus may include an inward mover 41 and an outward mover 42. The inward mover 41 moves a pallet P from the conveyor 11 through the roller conveyor 39 to a predetermined position on the horizontal inlet path section 6. The outward mover 42 moves a pallet P from a predetermined position on the horizontal outlet path section 7 through the roller conveyor 40 to a predetermined position on the conveyor 12. As shown with two-dot chain lines in FIG. 4, each pallet P may include a laterally protruding driven part 43. As also shown, each of the inward and outward movers 41 and 42 may be a pusher type driving means including a pusher 44, which can automatically engage with the driven part 43 to drive the pallet P by a predetermined stroke.

With reference to FIG. 1, a pallet P carrying a load W on it can be conveyed by the conveyor 11 to a predetermined position near the inlet of the conveying path. The inward mover 41 moves the conveyed pallet P onto the roller conveyor 39 and to the predetermined position on the horizontal inlet path section 6 of the conveying path 1. In the inlet path section 6, the pallet P stops and stands by with its side frames 31a and 31b supported on the roller rails 38a and 38b of the roller conveyor 39. In the meantime, the motor 21 drives the driving roller chains 13a and 13b of the circulating driver 9, moving one of the supporting and driving means 10 from the return path 8 into the inlet path section 6.

Specifically, the driving engager 24 of the supporting and driving means 10 moves into the horizontal inlet path section 6 slightly behind the intermediate cross frame 32c of the pallet P on standby. This engages the self-locking pawls 29a and 29b of the engager 24 with the cross frame 32c. At the same time, the horizontal-axis rollers 27a and 27b of the front pallet support 22 of the supporting and driving means 10 reaches a position just under the cross frame 32c, and their flanges engage with the grooves 35 of the frame 32c. Consequently, the engager 24 drives the pallet P on the roller conveyor 39 forward. When the pallet P moves forward to a certain extent, the horizontal-axis rollers 28a and 28b of the rear pallet support 23 of the supporting and driving means 10 reaches a position just under the pair of longitudinal frames 33a and 33b of the pallet P. Subsequently, the pallet P leaves the roller conveyor 39 and is then supported by the rollers 27a, 27b, 28a and 28b of the supports 22 and 23. The engager 24 moves the supported pallet P from the horizontal inlet path section 6, through the up-grade path section 3, higher horizontal section 5 and down-grade path section 4 in the drying furnace 2, to the horizontal outlet path section 7.

The supporting frames 25 and 26 supporting the pallet supports 22 and 23 have a suitable height from the circulating driver 9 so that the driver 9 and the pallets P supported by the supports 22 and 23 may not interfere. Accordingly, when the pallet supports 22 and 23 pass through the rear end of the up-grade path section 3 and the front end of the down-grade path section 4, the supports 22 and 23 are nearer to the moving path of the driver 9. When the pallet supports 22 and 23 pass through the front end of the up-grade path section 3 and the rear end of the down-grade path section 4, the supports 22 and 23 are farther from the moving path of the driver 9. The positions of the front support 22 and driving engager 24 of each supporting and driving means 10 are substantially similar in the conveying direction. Accordingly, the horizontal-axis rollers 27a and 27b of this support 22 can support a front portion of a pallet P through the intermediate cross frame 32c of the pallet, without shifting forward and backward from this frame 32c. The rear support 23 of each supporting and driving means 10 can support the longitudinal frames 33a and 33b of a pallet P. Accordingly, when each supporting and driving means 10 moves through the ends of the up-grade path section 3 and down-grade path section 4, the horizontal-axis rollers 28a and 28b of the associated rear support 23 can support a rear portion of a pallet P through the longitudinal frames 33a and 33b of the pallet, while rolling slightly forward and backward relative to these frames 33a and 33b.

Thus, a pallet P carrying a load W can be driven smoothly without interfering with the circulating driver 9. The driven pallet P passes through the up-grade path section 3, higher horizontal section 5 and down-grade path section 4 of the conveying path 1 in the drying furnace 2, where the load W undergoes thermal processing (for example, drying the coating film).

The pallet P is then conveyed from the drying furnace 2 to the horizontal outlet path section 7, where the driving engager 24 of the supporting and driving means 10 under the pallet moves from the conveying path 1 to the return path 8 so that the pallet may stop in the predetermined position on the outlet path section 7. In this position, the side frames 31a and 31b of the pallet P are supported horizontally on the roller rails 38a and 38b of the roller conveyor 40, even after the pallet supports 22 and 23 of the supporting and driving means 10 leaves the intermediate cross frame 32c and longitudinal frames 33a and 33b of the pallet. Until the front pallet support 22 leaves the pallet P, the rear pallet support 23 moves forward and horizontally. While this rear support 23 is moving forward, the flanges of its horizontal-axis rollers 28a and 28b pass through the grooves 35 of the intermediate cross frames 32b–32f of the pallet P without interfering with these frames.

The pallet P stopping in the horizontal outlet path section 7 and supported on the roller conveyor 40 is then moved by the outward mover 42 onto the conveyor 12, which conveys it to another location.

The illustrated structures of the pallets P, endless circulating driver 9, and pallet supporting and driving means 10 are specific examples, to which the present invention is not limited. For example, platforms or transfer devices other than a pallet may be used. The use of the specific conveying path 1 is not limited to the conveyance of pallets P through a drying furnace 2. In the foregoing embodiment, the pallets P are conveyed along the conveying path 1 through the drying furnace 2. In this case, the up-grade path section 3 and down-grade path section 4 of the conveying path 1 are formed on the inlet and outlet sides of the furnace 2 so that the higher horizontal section 5 of this path can be formed. For another use, for example, the conveying path 1 may include only an up-grade path section 3 or a down-grade path section 4. Alternatively, the conveying path 1 may include an up-grade path section and a down-grade path section to have a lower horizontal section between them. Additionally, the present invention is not limited to a drying furnace as other suitable known processing stations may be used, as well.

Having now described one or more exemplary embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

What is claimed is:

1. A conveying apparatus for conveying a pallet in a predetermined direction, comprising:
    a specific conveying path including
        a horizontal inlet path section;
        a horizontal outlet path section, the horizontal inlet path section and horizontal outlet path section each having an inner end; and
        an inclined path section connected to at least one of the inner ends of the inlet and outlet path sections;
    a return path;
    an endless circulating driver circulating between the conveying and return paths; and
    a plurality of pallet supporting and driving means mounted at intervals on the circulating driver;
    the supporting and driving means each including
        a front pallet support for supporting a front portion of the pallet;
        a rear pallet support for supporting a rear portion of the pallet; and
        a driving engager for automatically engaging with the pallet near the front pallet support;
    the pallet including
        a front supported part that can be supported by the front pallet support;
        a rear supported part that can be supported by the rear pallet support movable relative to the pallet in the predetermined direction; and
        an engaged part for engaging automatically with the driving engager;
    wherein the pallet conveyed to the inlet path section can be transferred onto one of the supporting and driving means, which conveys the pallet thereon along the conveying path to the outlet path section.

2. A conveying apparatus according to claim 1 further comprising:
    the pallet including
        a pair of side frames that can be supported by roller rails;
        a cross frame extending as both of the front supported part and the engaged part between the side frames; and
        a pair of right and left longitudinal frames extending as the rear supported part in the predetermined direction between the side frames;
    two roller conveyors each provided in one of the horizontal inlet and outlet path sections of the conveying path, the roller conveyors each including a pair of right and left roller rails for supporting both sides of the pallet.

3. A conveying apparatus according to claim 2 wherein the front and rear pallet supports of the pallet supporting and driving means each include a pair of right and left horizontal-axis rollers each having a flange, and wherein the front and rear supported parts of the pallet have grooves for engaging with the flanges of the rollers.

4. A conveying apparatus according to claim 3 wherein the driving engager of the pallet supporting and driving means includes:
    a pair of front and rear self-locking pawls for engaging with front and rear sides respectively of the engaged part of the pallet, the pawls being able to tilt toward each other; and
    urging means urging the self-locking pawls into an erect position.

5. A conveying apparatus according to claim 4 wherein the endless circulating driver includes:
    a pair of right and left driving chains;
    a pair of guide rails each supporting and guiding one of the driving chains;
    a front connecting member and a rear connecting member spaced from the front connecting member in the predetermined direction, the connecting members connecting the driving chains together;
    a front supporting frame standing on the front connecting member and supporting the front pallet support and the driving engager of the pallet supporting and driving means; and
    a rear supporting frame standing on the rear connecting member and supporting the rear pallet support of the supporting and driving means.

6. A conveying apparatus according to claim 3 wherein the endless circulating driver includes:
    a pair of right and left driving chains;
    a pair of guide rails each supporting and guiding one of the driving chains;
    a front connecting member and a rear connecting member spaced from the front connecting member in the predetermined direction, the connecting members connecting the driving chains together;
    a front supporting frame standing on the front connecting member and supporting the front pallet support and the driving engager of the pallet supporting and driving means; and
    a rear supporting frame standing on the rear connecting member and supporting the rear pallet support of the supporting and driving means.

7. A conveying apparatus according to claim 2 wherein the endless circulating driver includes:
    a pair of right and left driving chains;
    a pair of guide rails each supporting and guiding one of the driving chains;
    a front connecting member;
    a rear connecting member spaced from the front connecting member in the predetermined direction, the connecting members connecting the driving chains together;

a front supporting frame standing on the front connecting member and supporting the front pallet support and the driving engager of the pallet supporting and driving means; and a rear supporting frame standing on the rear connecting member and supporting the rear pallet support of the supporting and driving means.

8. A conveying apparatus according to claim 2 wherein the driving engager of the pallet supporting and driving means includes:

a pair of front and rear self-locking pawls for engaging with front and rear sides respectively of the engaged part of the pallet, the pawls being able to tilt toward each other; and urging means urging the self-locking pawls into an erect position.

9. A conveying apparatus according to claim 8 wherein the endless circulating driver includes:

a pair of right and left driving chains;

a pair of guide rails each supporting and guiding one of the driving chains;

a front connecting member and a rear connecting member spaced from the front connecting member in the predetermined direction, the connecting members connecting the driving chains together;

a front supporting frame standing on the front connecting member and supporting the front pallet support and the driving engager of the pallet supporting and driving means; and a rear supporting frame standing on the rear connecting member and supporting the rear pallet support of the supporting and driving means.

10. A conveying apparatus according to claim 1 wherein the front and rear pallet supports of the pallet supporting and driving means each include a pair of right and left horizontal-axis rollers each having a flange, and wherein the front and rear supported parts of the pallet have grooves for engaging with the flanges of the rollers.

11. A conveying apparatus according to claim 10 wherein the driving engager of the pallet supporting and driving means includes:

a pair of front and rear self-locking pawls for engaging with front and rear sides respectively of the engaged part of the pallet, the pawls being able to tilt toward each other; and urging means urging the self-locking pawls into an erect position.

12. A conveying apparatus according to claim 11 wherein the endless circulating driver includes:

a pair of right and left driving chains;

a pair of guide rails each supporting and guiding one of the driving chains;

a front connecting member and a rear connecting member spaced from the front connecting member in the predetermined direction, the connecting members connecting the driving chains together;

a front supporting frame standing on the front connecting member and supporting the front pallet support and the driving engager of the pallet supporting and driving means; and a rear supporting frame standing on the rear connecting member and supporting the rear pallet support of the supporting and driving means.

13. A conveying apparatus according to claim 10 wherein the endless circulating driver includes:

a pair of right and left driving chains;

a pair of guide rails each supporting and guiding one of the driving chains;

a front connecting member and a rear connecting member spaced from the front connecting member in the predetermined direction, the connecting members connecting the driving chains together;

a front supporting frame standing on the front connecting member and supporting the front pallet support and the driving engager of the pallet supporting and driving means; and a rear supporting frame standing on the rear connecting member and supporting the rear pallet support of the supporting and driving means.

14. A conveying apparatus according to claim 1 wherein the driving engager of the pallet supporting and driving means includes:

a pair of front and rear self-locking pawls for engaging with front and rear sides respectively of the engaged part of the pallet, the pawls being able to tilt toward each other; and urging means urging the self-locking pawls into an erect position.

15. A conveying apparatus according to claim 14 wherein the endless circulating driver includes:

a pair of right and left driving chains;

a pair of guide rails each supporting and guiding one of the driving chains;

a front connecting member and a rear connecting member spaced from the front connecting member in the predetermined direction, the connecting members connecting the driving chains together;

a front supporting frame standing on the front connecting member and supporting the front pallet support and the driving engager of the pallet supporting and driving means; and a rear supporting frame standing on the rear connecting member and supporting the rear pallet support of the supporting and driving means.

16. A conveying apparatus according to claim 1 wherein the endless circulating driver includes:

a pair of right and left driving chains;

a pair of guide rails each supporting and guiding one of the driving chains;

a front connecting member and a rear connecting member spaced from the front connecting member in the predetermined direction, the connecting members connecting the driving chains together;

a front supporting frame standing on the front connecting member and supporting the front pallet support and the driving engager of the pallet supporting and driving means; and a rear supporting frame standing on the rear connecting member and supporting the rear pallet support of the supporting and driving means.

* * * * *